June 26, 1956   KAZUMA ADACHI   2,751,766
CLUTCH INSTALLATION FOR PREVENTION OF NOISES
Filed May 11, 1953
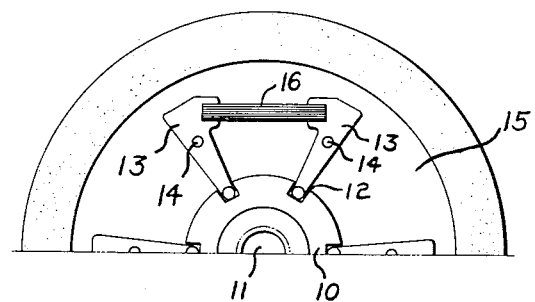
KAZUMA ADACHI
INVENTOR
BY Wenderoth, Lind & Ponack
ATTORNEYS

United States Patent Office 2,751,766
Patented June 26, 1956

2,751,766
CLUTCH INSTALLATION FOR PREVENTION OF NOISES

Kazuma Adachi, Osaka, Japan

Application May 11, 1953, Serial No. 354,356

1 Claim. (Cl. 64—27)

This invention relates to a clutch device adapted to prevent unnecessary noises in the operation thereof. In this device, the hub is connected to the clutch plate through leaf springs and thus the clutch effectively absorbs the shock of the engagement of the clutch parts in the manner characteristic of leaf springs.

It is an object of the present invention to prevent the noise caused by the vibration at the start and during the operation of the engine, the speed change gears, the engagement of the various gears, the drive shaft and the differential which are caused during the operation of a normal clutch mechanism.

Other and further objects of this invention will become apparent from the following specification and claim taken together with the accompanying drawing in which is shown the preferred embodiment of the clutch mechanism of the present invention.

In the figure, there is shown a hub 10 having an aperture in the center thereof to receive a splined shaft 11. Around the periphery of the hub 10 are a plurality of spaced recesses 12 in which the ends of levers 13 are retained. The levers 13 are pivotally mounted on pins 14 which are mounted on the clutch plate 15 and are supported in a cover plate which loosely surrounds the hub 10 and retains the parts of the clutch between the clutch plate and the cover plate. This cover plate has been removed in the drawing in order to show the relationship of the parts beneath it. A bundle of leaf springs 16 is secured at one end to one of the levers 13 and at the other end to the end of an adjacent lever 13.

It is thus seen that the hub, which is between the clutch plate and the cover plate, is connected to the clutch plate through the pivoted levers, which in turn are acted upon by the bundle of leaf springs 16. On relative movement between the clutch plate and the hub, the bundle of leaf springs will be resiliently distorted, and will act as a buffer to the shock to the engine, speed change gears, drive shaft and differential.

It will be seen that the bundle of leaf springs provides an advantage over the previously used coil springs. Coil springs are adapted to work under a maximum load, and thus fail to work satisfactorily under any load below the maximum load. In the case of the bundle of leaf springs, however, each of them are relatively weak. When they are associated in a bundle, however, they react to relatively small shocks as well as to a large shock. Thus, the advantages of the coil spring are retained, while the disadvantages are removed.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim as my invention:

A clutch installation comprising a clutch plate, a hub adjacent said clutch plate having an aperture therein to receive a splined shaft, said hub having a plurality of circumferentially spaced recesses on its outer perimeter, a plurality of supports mounted on said clutch plate and projecting outwardly adjacent said hub, a plurality of levers rotatably mounted on said supports, each lever having one end thereof engaged in one of said circumferentially spaced recesses, a plurality of leaf springs each secured at one end to the other end of one of said levers and secured at the other end to the other end of an adjacent one of said levers, said springs adapted to be resiliently distorted on relative movement between said hub and said clutch plate, and a retaining plate retaining said levers and springs between said clutch plate and retaining plate.

References Cited in the file of this patent

UNITED STATES PATENTS

| 1,993,125 | Tower et al. | Mar. 5, 1935 |
| 2,029,516 | Tower | Feb. 4, 1936 |
| 2,220,566 | Wood | Nov. 5, 1940 |